United States Patent [19]

Mukaida

[11] Patent Number: 6,005,830

[45] Date of Patent: Dec. 21, 1999

[54] SYSTEM FOR CHECKING THE RECODING STATE OF DATA ON A MAGNETO-OPTICAL DISK

[75] Inventor: Masaru Mukaida, Tokyo, Japan

[73] Assignee: NEC Corporation, Tokyo, Japan

[21] Appl. No.: 09/104,228

[22] Filed: Jun. 25, 1998

[30] Foreign Application Priority Data

Jun. 27, 1997 [JP] Japan ................................ 9-172071

[51] Int. Cl.⁶ .......................... G11B 11/00; G11B 7/00
[52] U.S. Cl. .............................. 369/13; 369/112
[58] Field of Search .......................... 369/13, 112, 109, 369/110, 116, 44.12, 44.14, 44.23, 44.27, 47, 54, 118, 44.24

[56] References Cited

U.S. PATENT DOCUMENTS 4,729,122   3/1988   Itoh ........................................... 369/13
5,559,769   9/1996   Ando et al. ............................ 369/44.27
5,726,962   3/1998   Okada et al. ............................ 369/112

FOREIGN PATENT DOCUMENTS 8-221911   8/1996   Japan .

*Primary Examiner*—Ali Neyzari
*Attorney, Agent, or Firm*—Whitham, Curtis & Whitham

[57] ABSTRACT

A device for checking the recording state of a magneto-optical recording disk includes a detector for detecting a s-polarized light component and a p-polarized light component from a reflected light reflected from the portion of the magneto-optical recording disk. One of the s-polarized and p-polarized light components is subtracted from the other to produce a difference signal and the s-polarized and p-polarized light components are added to produce an addition signal. The difference signal is divided by the addition signal to produce a normalized detection signal. The recording state is determined based on a level change of the normalized detection signal while data is being recorded onto the magneto-optical recording disk.

17 Claims, 2 Drawing Sheets

RECORDING INFORMATION

DIFFERENCE SIGNAL $S_{SUB}$

ADDITION SIGNAL $S_{ADD}$

NORMALIZED DETECTION SIGNAL $S_{DET}$

DELAY DURATION INFORMATION $T_D$

SYSTEM FOR CHECKING THE RECODING STATE OF DATA ON A MAGNETO-OPTICAL DISK

BACKGROUND OF THE INVENTION

1. Field of the Invention

The present invention generally relates to an optical disk recording apparatus, and in particular to method and device for checking or verifying the recording state of data.

2. Description of the Related Art

As a type of information recording technology, magneto-optical recording has been widely used to store a large amount of data onto a magneto-optical disk in which a laser beam is used to heat a small portion of the disk. The heating causes a weak magnetic field to change the orientation of the portion, thus recording onto the disk. The recorded data onto the disk is reproduced by using the magneto-optical Kerr effect which occurs when plane polarized light is reflected from the surface of the disk with slight elliptical polarization depending on the polarity of the reflecting portion on the disk. The magneto-optical Kerr effect is also used to check or verify the recording state of data.

There has been proposed a check method which can check the recording state while data is being recorded on the magnetic-optic disk in Japanese Patent Unexamined Publication No. 8-221911. According to this conventional method, when a recording beam produces a spot on the disk, s-polarized and p-polarized light components are detected from the reflected light at the spot and then a difference signal is produced by subtracting the one light component from the other. The amplitude of the different signal is initially increased and then decreased when the heating by the recording beam causes a decrease in the Kerr rotation angle. Since such an amplitude change of the difference signal ideally reflects the Kerr rotation angle, it can be used to check the recording state of data on the disk while data is being recorded.

SUMMARY OF THE INVENTION

However, the inventor found that actually an amplitude change of the difference signal ($\Delta V_{AMP}$) is proportional to the product of intensity of recording laser beam (Pw), reflectance of the disk (R), and a change of the Kerr rotation angle ($\theta k1-\theta k2$), where $\theta k1$ is a Kerr rotation angle at the initial time when the amplitude of the difference signal reaches the maximum and $\theta k2$ is a Kerr rotation angle when the recording laser beam has heated the spot of the disk, that is, $\Delta V_{AMP}$ Pw×R×($\theta k1-\theta k2$). In other words, the amplitude change of the difference signal reflects not only the change of the Kerr rotation angle ($\theta k1-\theta k2$) but also the laser beam power (Pw) and the disk reflectance (R) which are noise components, resulting in the reduced accuracy of verify operation.

An object of the present invention is to provide method and device which can check the recording state of data on a magneto-optic disk with sufficiently high accuracy.

According to an aspect of the present invention, a device for checking a recording state of a magneto-optical recording medium is comprised of a recording head for emitting a recording laser beam onto a portion of the magneto-optical recording medium. Further, the device includes a first detector for detecting a change of Kerr rotation angle from a reflected light reflected from the portion of the magneto-optical recording medium to produce a change detection signal, a second detector for detecting an intensity of the reflected light to produce an intensity detection signal, and a compensator for compensating the change detection signal using the intensity detection signal to produce a normalized detection signal. The recording state of data is determined based on a level change of the normalized detection signal.

According to another aspect of the present invention, a device includes a detector for detecting a first and second polarized light components from a reflected light reflected from the portion of the magneto-optical recording medium, wherein the first and second polarized light components are orthogonal to each other. The device further includes a subtracter, an adder, and a division calculator. The subtracter subtracts one of the first and second polarized light components from the other to produce a difference signal. The adder adds the first and second polarized light components to produce an addition signal. And the division calculator divides the difference signal by the addition signal to produce a normalized detection signal. The recording state is determined based on a level change of the normalizing detection signal.

As described before, an amplitude change ($\Delta V_{AMP}$) of the difference signal reflects not only a change of the Kerr rotation angle ($\theta k1-\theta k_2$) but also the laser beam power (Pw) and the disk reflectance (R), that is, $\Delta V_{AMP}$ Pw×R×($\theta k1-\theta k2$). According to the present invention, the adder produces the addition signal which is proportional to the product of the laser beam power (Pw) and the disk reflectance (R). Therefore, by dividing the difference signal by the addition signal to produce the normalized detection signal, the difference signal is compensated for noise components of the laser beam power (Pw) and the disk reflectance (R). Therefore, an amplitude change of the normalized detection signal reflects only the Kerr rotation angle ($\theta k1-\theta k2$), resulting in accurate verify operation of the magneto-optical recording medium

DETAILED DESCRIPTION OF THE PREFERRED EMBODIMENT

Figure 1:
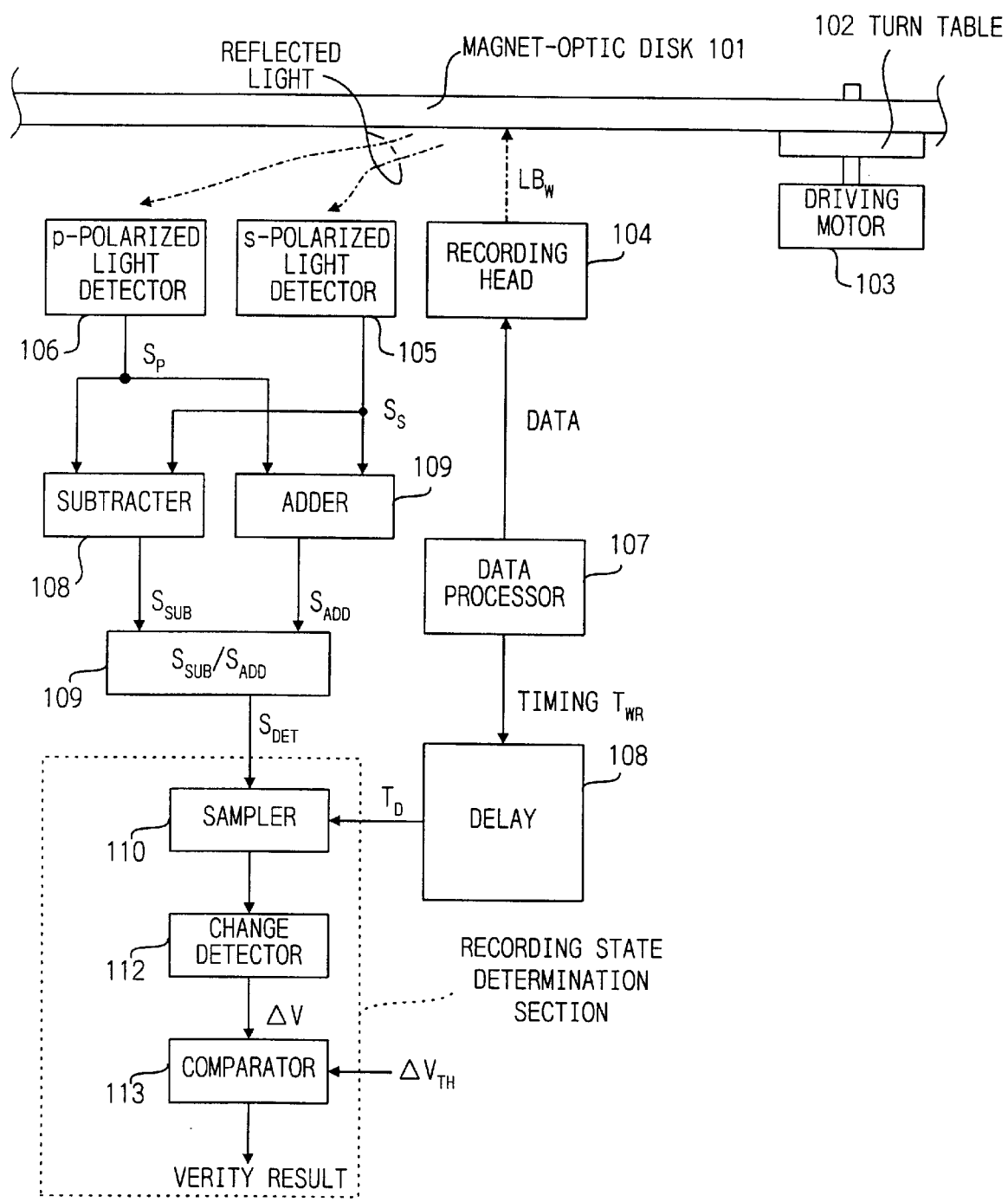
FIG. 1 is a block diagram showing a magneto-optical disk recording apparatus employing a recording state check device according to an embodiment of the present invention.

Referring to FIG. 1, a magnetic-optical disk recording apparatus is provided with a disk rotating mechanism and an information read/write system. A magneto-optical disk 101 is detachably fixed to a turntable 102 which can be rotated by a driving motor 103. Information reading and writing are performed by an optical head which is provided on the recording side of the magneto-optical disk 101.

The optical head includes a recording head 104, an s-polarized light detector 105 and a p-polarized light detector 106. Further, the optical head is equipped with an auto-focusing and auto-tracking mechanism, a seek mechanism, and a magnetic field generator which are not shown in this figure for simplicity. The magnetic field generator such as an electromagnet is used to apply a magnetic field to a small portion which is heated by a recording laser beam so as to record data onto the magneto-optical disk 101.

The recording head 104 has a laser source which emits a recording laser beam $LB_W$ to the magneto-optical disk 101 depending on data received from a data processor 107. As described before, when the small portion on the magneto-optical disk 101 is radiated with the recording laser beam $LB_W$, the portion is heated to change in magnetic orientation depending on the applied magnetic field. At the same time, the recording laser beam $LB_W$ is reflected from the portion on the magneto-optical disk 101 and the reflected light is detected by the s-polarized light detector 105 and the p-polarized light detector 106. Since the reflected light changes in Kerr rotation angle depending on a change of the orientation caused by the heating and the applied magnetic field, the Kerr rotation angle can be detected based on the s-polarized and p-polarized components of the reflected light which are detected by the s-polarized light detector 105 and the p-polarized light detector 106, respectively.

The s-polarized component signal $S_s$ detected by the s-polarized light detector 105 is output to a subtracter 108 and an adder 109. The p-polarized component $S_p$ detected by the p-polarized light detector 106 is also output to subtracter 108 and the adder 109. The subtracter 108 subtracts the one from the other to produce a difference signal $S_{SUB}$. The adder 109 adds them to produce an addition signal $S_{ADD}$. An operational circuit 109 divides the difference signal $S_{SUB}$ by the addition signal $S_{ADD}$ to produce a normalized detection signal $S_{DET}$ which is output to a recording state determination section.

Further, the recording state determination section receives a timing signal from the data processor 107 through a delay section 111. More specifically, the data processor 107 outputs a timing signal $T_{WR}$ to the delay section 111 when the data to be written is output to the recording head 104. The delay section 111 delays the data timing signal $T_{WR}$ by a predetermined delay time DL to produce a sampling duration signal $T_D$ which is output to the recording state determination section.

The recording state determination section is implemented with a sampler 110, a level change detector 112, a comparator 113 and other necessary memories (not shown). The sampler 110 samples detection data from the normalized detection signal $S_{DET}$ for a time period determined by the sampling duration signal $T_D$. The level change detector 112 detects a level change $\Delta V$ from the normalized detection signal $S_{DET}$ for the sampling duration. The comparator 113 compares the level change $\Delta V$ to a predetermined threshold $\Delta V_{TH}$ to produce a verify result depending on whether the level change $\Delta V$ is greater than the predetermined threshold $\Delta V_{TH}$.

The recording state determination section may be implemented with a single-chip microcomputer including a memory storing a verify operation program and the other circuit blocks 107–109 may be implemented with dedicated hardware circuits. The circuit blocks 107–113 may be also implemented with a program-controlled processor running the verify operation program. Alternatively, all the circuit blocks 107–113 may be also implemented with dedicated hardware circuits. Further, the verify operation program may be stored onto a storage such as a floppy disk or CD-ROM and if may be installed onto the microcomputer.

The details of the verify operation will be described hereafter referring to FIGS. 2A–2E.

Figure 2A:
FIGS. 2A–2E are waveform diagrams for explanation of a verify operation of the embodiment as shown in FIG. 1.

Referring to FIG. 2A, it is assumed that the recording data is output to the recording head 104 which emits the recording laser beam $LB_W$ to the magneto-optical disk 101 depending on the recording data. The recording laser beam $LB_W$ is reflected from the portion on the magneto-optical disk 101 and the reflected light is detected by the s-polarized light detector 105 and the p-polarized light detector 106. As described before, when the small portion on the magneto-optical disk 101 is radiated with the recording laser beam $LB_W$, the portion is not heated initially, resulting in no change in the Kerr rotation angle. Therefore, the amplitude of the difference signal $S_{SUB}$ obtained by the subtracter 108 is initially increased and then decreased when the heating by the recording laser beam $LB_W$ causes a change in the Kerr rotation angle as shown in FIG. 2B.

Figure 2B:

Referring to FIG. 2B, after a lapse of the delayed time DL, the amplitude of the difference signal $S_{SUB}$ is increased to the peak value and is then decreased to a stable value when the heating by the recording laser beam $LB_W$ causes a change in the Kerr rotation angle. As described before, the difference $\Delta V_{AMP}$ reflects not only a change of the Kerr rotation angle ($\theta k1 - \theta k2$) but also the laser beam power (Pw) and the disk reflectance (R), that is, $\Delta V_{AMP} \propto Pw \times R \times (\theta k1 - \theta k2)$, when $\theta k1$ is a Kerr rotation angle at the initial time when the amplitude of the difference signal reaches the peak value and $\theta k2$ is a Kerr rotation angle at the time when the amplitude of the difference signal reaches the stable value.

Figure 2C:

As shown in FIG. 2C, on the other hand, the addition signal $S_{ADD}$ obtained by the adder 109 is proportional to the product of the laser beam power (Pw) and the disk reflection (R), that is, $S_{ADD} \propto Pw \times R$.

Figure 2D:
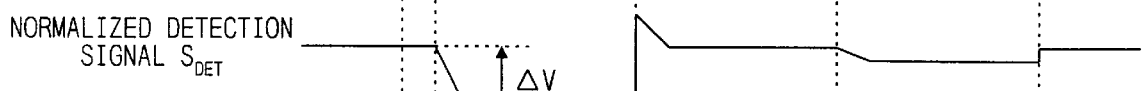

As shown in FIG. 2D, the normalized detection signal $S_{DET}$ is obtained by dividing the difference signal $S_{SUB}$ by the addition signal $S_{ADD}$, that is, $S_{DET} = S_{SUB}/S_{ADD}$. Therefore, an amplitude change $\Delta V$ of the normalized detection signal $S_{DET}$ is proportional to only a change of the Kerr rotation angle, that is, $\Delta V \propto (\theta k1 - \theta k2)$. In other words, by detecting the amplitude change $\Delta V$ of the normalized detection signal $S_{DET}$, the recording state can be verified with accuracy.

Figure 2E:

Referring to FIG. 2E, the sampler 110 samples detection data from the normalized detection signal $S_{DET}$ for a time period determined by the sampling duration signal $T_D$ which is delayed by the delay section 111 by the delay time DL. The level change detector 112 sequentially receives the detection data from the sampler 110 and compares the current sampled data to the previous sampled data to detect a level change $\Delta V$ between them.

The comparator 113 compares the level change $\Delta V$ to the predetermined threshold $\Delta V_{TH}$ to produce a verify result. More specifically, when the level change $\Delta V$ is greater than the predetermined threshold $\Delta V_{TH}$, the recording state is determined to be good or acceptable and otherwise no good or unacceptable.

What is claimed is:

1. A device for checking a recording state of a magneto-optical recording medium by removing a noise component from a detection signal, comprising:

a recording head for emitting a recording laser beam onto a portion of the magneto-optical recording medium;

a first detector for detecting a change of Kerr rotation angle from a reflected light reflected from the portion of the magneto-optical recording medium to produce a change detection signal;

a second detector for detecting an intensity of the reflected light to produce a noise signal indicative of a noise component in the change detection signal;

a compensate for removing the noise signal from the change detection signal to produce a normalized detection signal; and a determiner for determining a recording state based on a level change of the normalized detection signal.

2. The device according to claim 1, wherein the compensator divides the change detection signal by the noise signal to produce the normalized detection signal.

3. A device for checking a recording state of a magneto-optical recording medium, comprising:

a recording head for emitting a recording laser beam onto a portion of the magneto-optical recording medium;

a detector for detecting a first and second polarized light components from a reflected light reflected from the portion of the magneto-optical recording medium, wherein the first and second polarized light components are orthogonal to each other;

a subtracter for subtracting one of the first and second polarized light components from the other to produce a difference signal;

an adder for adding the first and second polarized light components to produce an addition signal;

a division calculator for dividing the difference signal by the addition signal to produce a normalized detection signal; and a determiner for determining a recording state based on a level change of the normalized detection signal.

4. A device for checking a recording state of a magneto-optical recording medium, comprising:

a recording head for emitting a recording laser beam onto a portion of the magneto-optical recording medium;

a detector for detecting a first and second polarized light components from a reflected light reflected from the portion of the magneto-optical recording medium, wherein the first and second polarized light components are orthogonal to each other;

a subtracter for subtracting one of the first and second polarized light components from the other to produce a difference signal;

an adder for adding the first and second polarized light components to produce an addition signal;

a division calculator for dividing the difference signal by the addition signal to produce a normalized detection signal; and a determiner for determining a recording state based on a level change of the normalized detection signal, wherein the determiner comprises:

a sampler for sampling sampled data from the normalized detection signal corresponding to the recording laser beam;

a level change detector for detecting the level change of the normalized detection signal based on the sampled data; and a comparator for comparing the level change to a predetermined threshold to produce a state determination signal.

5. The device according to claim 3, further comprising:

a timing adjuster for adjusting a determination start timing of the determiner to a leading edge of the normalized detection signal.

6. The device according to claim 5, wherein the normalized detection signal changes in level from an initial level to a stable level, wherein a level difference between the initial level and the stable level reflects a change of magneto-optical Kerr rotation angle caused by magneto-optical Kerr effect.

7. The device according to claim 4, further comprising:

a timing adjuster for adjusting a sampling start timing of the sampler to a leading edge of the normalized detection signal.

8. The device according to claim 7, wherein the normalized detection signal changes in level from an initial level to a stable level, wherein a level difference between the initial level and the stable level reflects a change of magneto-optical Kerr rotation angle caused by magneto-optical Kerr effect.

9. A method for determining a recording state of a magneto-optical recording medium, comprising the steps of:

radiating a portion of the magneto-optical recording medium with a recording laser beam;

detecting a change of Kerr rotation angle from a reflected light reflected from the portion of the magneto-optical recording medium to produce a change detection signal;

detecting an intensity of the reflected light to produce an intensity detection signal;

compensating the change detection signal using the intensity detection signal to produce a normalized detection signal; and determining a recording state based on a level change of the normalized detection signal.

10. The method according to claim 9, wherein the change detection signal is divided by the intensity detection signal to produce the normalized detection signal.

11. A method for determining a recording state of a magneto-optical recording medium, comprising the steps of:

emitting a recording laser beam onto a portion of the magneto-optical recording medium;

detecting a first and second polarized light components from a reflected light reflected from the portion of the magneto-optical recording medium, wherein the first and second polarized light components are orthogonal to each other;

subtracting one of the first and second polarized light components from the other to produce a difference signal;

adding the first and second polarized light components to produce an addition signal;

dividing the difference signal by the addition signal to produce a normalized detection signal; and determining a recording state based on a level change of the normalized detection signal.

12. A method for determining a recording state of a magneto-optical recording medium, comprising the steps of:

emitting a recording laser beam onto a portion of the magneto-optical recording medium;

detecting a first and second polarized light components from a reflected light reflected from the portion of the magneto-optical recording medium, wherein the first and second polarized light components are orthogonal to each other;

subtracting one of the first and second polarized light components from the other to produce a difference signal;

adding the first and second polarized light components to produce an addition signal;

dividing the difference signal by the addition signal to produce a normalized detection signal; and determining a recording state based on a level change of the normalized detection signal, wherein the determining step comprises the steps of:

sampling sampled to data from the normalized detection signal corresponding to the recording laser beam;

detecting the level change of the normalized detection signal based on the sampled data; and comparing the level change to a predetermined threshold to produce a state determination signal.

13. The method according to claim 11, further comprising the step of:

adjusting a determination start timing of the determiner to a leading edge of the normalized detection signal.

14. A method for determining a recording state of a magneto-optical recording medium, comprising the steps of:

emitting a recording laser beam onto a portion of the magneto-optical recording medium;

detecting a first and second polarized light components from a reflected light reflected from the portion of the magneto-optical recording medium, wherein the first and second polarized light components are orthogonal to each other;

subtracting one of the first and second polarized light components from the other to produce a difference signal;

adding the first and second polarized light components to produce an addition signal;

dividing the difference signal by the additional signal to produce a normalized detection signal;

determining a recording state based on a level change of the normalized detection signal; and adjusting a determination start timing of the determiner to a leading edge of the normalized detection signal, wherein the normalized detection signal changes in level from an initial level to a stable level, wherein a level difference between the initial level and the stable level reflects a change of magneto-optical Kerr rotation angle caused by magneto-optical Kerr effect.

15. The method according to claim 12, further comprising the step of:

adjusting a sampling start timing of the sampler to a leading edge of the normalized detection signal.

16. The method according to claim 15, wherein the normalized detection signal changes in level from an initial level to a stable level, wherein a level difference between the initial level and the stable level reflects a change of magneto-optical Kerr rotation angle caused by magneto-optical Kerr effect.

17. A disk recording apparatus for recording data onto a magneto-optical recording disk, comprising:

a rotator for rotating the magneto-optical recording disk;

an information recording head of remitting a recording laser beam onto a portion of the magneto-optical recording disk which is being rotated;

a detector for detecting a s-polarized light component and a p-polarized light component from a reflected light reflected from the portion of the magneto-optical recording disk;

a subtracter for subtracting one of the s-polarized and p-polarized light components from the other to produce a difference signal;

an adder for adding the s-polarized and p-polarized light components to produce an addition signal;

a division calculator for dividing the difference signal by the addition signal to produce a normalized detection signal; and a determiner for determining a recording state based on a level change of the normalized detection signal while the recording laser beam is being emitted onto the portion.

* * * * *